Oct. 18, 1955         A. COX         2,720,813
ANAMORPHOSING OPTICAL SYSTEM
Filed Oct. 7, 1953
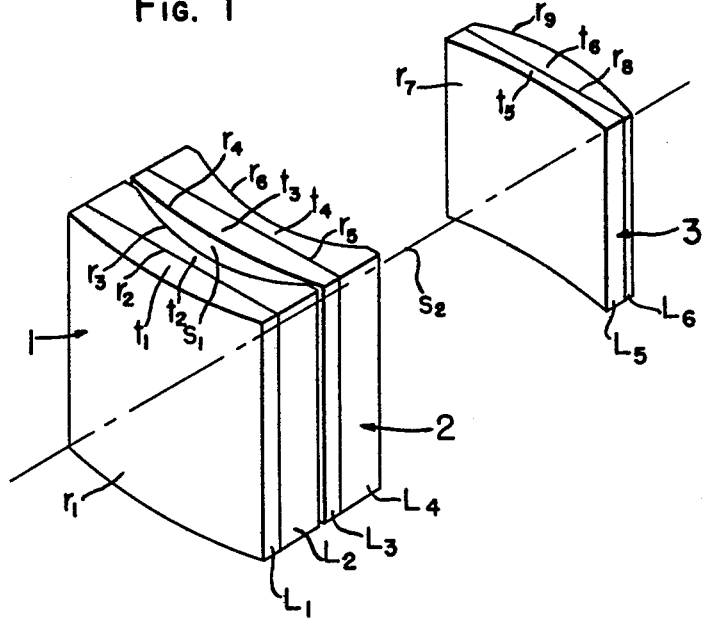
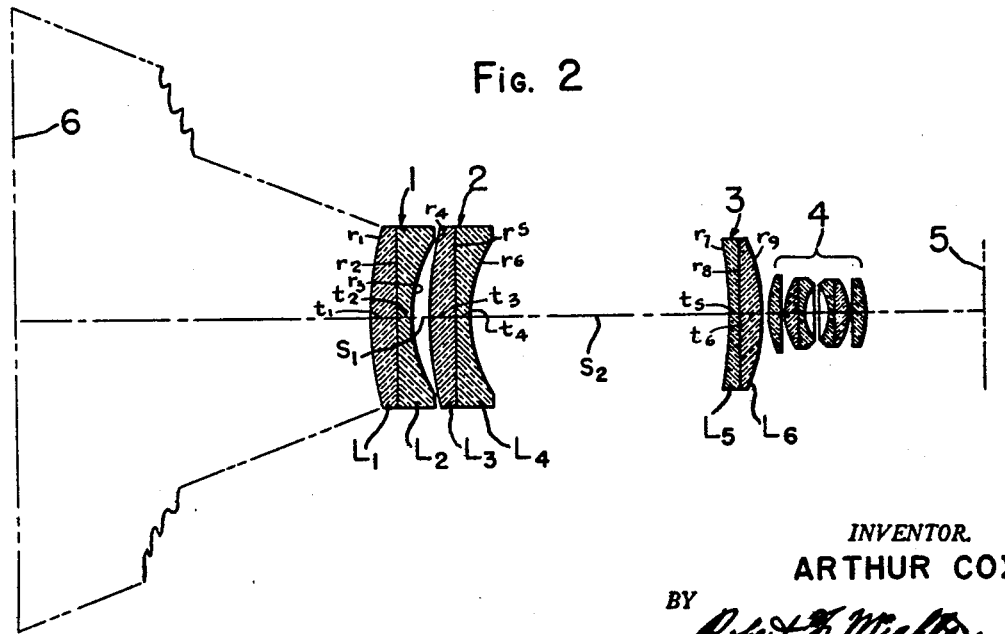
INVENTOR.
ARTHUR COX
BY Robert F. Mueller
ATTY.

United States Patent Office 2,720,813
Patented Oct. 18, 1955

2,720,813
ANAMORPHOSING OPTICAL SYSTEM

Arthur Cox, Park Ridge, Ill., assignor to Bell & Howell Company, Chicago, Ill., a corporation of Illinois Application October 7, 1953, Serial No. 384,606

4 Claims. (Cl. 88—57)

My invention is applicable to the taking and projection of motion pictures, although not limited to this use alone, and as so applied contemplates photographing through an anamorphosing system an object field of relatively great width as compared to its height and thereby imaging the object field in horizontally compressed form on the standard motion picture film frame having a 4 to 3 width to height ratio, and projecting through the same or a corresponding anamorphosing system the horizontally compressed image on the film and thereby horizontally expanding the projected image to conform with the width to height ratio of the original object field, so that while a standard motion picture frame is employed, the projected image is desirably relatively wide or panoramic and consequently promotes the illusion of depth particularly where the projection screen is slightly concave in the horizontal plane.

Objects of the invention reside in the provision of an anamorphosing optical system of the cylindrical type which is particularly adapted for the above application, which is corrected for spherical and chromatic aberration, coma, distortion, and field curvature particularly in that it provides a relatively flat tangential field in a plane perpendicular to the generatrices of the cylindrical surfaces thereof, which permits of relatively weak cylindrical surfaces throughout, and which is relatively economical to manufacture.

The invention will be better understood by reference to the accompanying drawing forming a part hereof and in which—

Figure 1 is a perspective view of an anamorphosing system embodying my invention; and Figure 2 is a section of this system and a real image forming spherical lens functionally associated therewith, and taken in a plane perpendicular to the generatrices of the cylindrical surfaces of the anamorphosing system.

Referring to the drawing, the anamorphosing system of the invention comprises a front negative cylindrical component comprising two closely spaced chromatically corrected negative cylindrical doublets 1 and 2 and a rear positive cylindrical component 3 comprising a chromatically corrected positive cylindrical doublet, which have the generatrices of their cylindrical surfaces disposed in parallelism and which are respectively of relatively short and long focal lengths and are spaced axially of the system a distance equal to the difference between their focal lengths when the system is focused for infinity.

The anamorphosing system is neutral in the axial plane thereof in which the generatrices of its cylindrical surfaces lie, so that its imaging is normal in this plane, but in the axial plane of the system perpendicular to the generatrices of its cylindrical surfaces, the imaging of the system with reference to an object plane spaced forwardly beyond the negative component of the system is a compression of a relatively great object field extent and conversely, the imaging from a plane spaced rearwardly of the positive component is an expansion and a resulting relatively great image extent.

In the use of the anamorphosing system for the formation of real images as in the photographing or projection of pictures, it is combined with a suitable spherical lens, as shown in Figure 2 in which a photographic objective 4 is arranged at the rear of the anamorphosing system between the positive component 3 and the focal plane 5 of a camera for the imaging of an objective field, represented by a plane 6, spaced forwardly of the anamorphosing system, on a film at the focal plane of the camera. When the system is used for the projection of pictures, a suitable projection objective and a projector are substituted for the photographic objective and camera with the projection objective arranged between the positive component 3 and the film plane of the projector, which may be assumed as represented by the plane 5, for the imaging of an image on a film at the film plane onto a screen which may be assumed as represented by the plane 6.

When the combined system is focused for infinity both the anamorphosing system and spherical lens are focused for infinity as the light between the positive element 3 of the anamorphosing system and the spherical lens 4 is collimated, and when the combined system is focused for finite distances both the anamorphosing system and the spherical lens are correspondingly focused, the anamorphosing system being focused by relative adjustment between the negative and positive components 1—2 and 3 and the spherical lens being focused with reference to the plane 5, and preferably the positive component 3 being axially fixed with the spherical lens and the negative component 1—2 being adjusted relative to the positive component 3.

Assuming that the anamorphosing system is used for the taking and projection of motion pictures and that the standard motion picture film frame, having a 4 to 3 width to height ratio, is employed, the axial plane of the system perpendicular to the generatrices of the cylindrical surfaces of the system is disposed horizontally, so that in taking pictures, the vertical imaging of the object field is normal and conforms with the height of the standard motion picture frame and the horizontal imaging of the object field is a compression of a relatively great object field extent and thus conforms with the width of the standard motion picture frame, and in projecting the horizontally compressed image on the film, the vertical imaging of the image on the film is normal and the horizontal imaging thereof is expanded, so that the projected image conforms with the height and width ratio of the original object field and so is desirably wide or panoramic. In the example specifically described herein the compression or expansion ratio is 2 to 1.

Referring particularly to Figure 1, the negative doublets 1 and 2 of the negative component, which are preferably identical, have relatively weak convex exterior cylindrical surfaces, respectively designated at $r_1$ and $r_4$, facing away from the positive component, and relatively strong concave exterior cylindrical surfaces, respectively designated at $r_3$ and $r_6$, facing toward the positive component, and the positive component doublet 3 has relatively weak concave and strong convex exterior cylindrical surfaces, respectively designated at $r_7$ and $r_9$, respectively facing toward and away from the negative component, all of these cylindrical surfaces having the generatrices thereof disposed in parallelism as hereinbefore described. Each of these doublets comprises plano-cylindrical elements having their plane surfaces facing each other and preferably cemented together, the positive and negative elements of the negative doublet 1 being respectively designated at $L_1$ and $L_2$ and the plane facing surfaces thereof being designated at $r_2$, the positive and negative elements of the negative doublet 2 being respectively designated at $L_3$ and $L_4$ and the plane facing surfaces thereof being designated at $r_5$, and the negative and positive elements of the positive doublet 3 being respectively designated at L5 and L6 and the plane facing surfaces thereof being designated at $r_8$. The axial thickness of the elements $L_1$ to $L_6$ are respectively designated by $t_1$ to $t_6$ and the axial separation of the negative doublets and that of the negative and positive components are respectively designated by $s_1$ and $s_2$.

A preferred example of the invention conforms with the following table in which dimensions are in terms of inches, and in which the indices of refraction for the D line and the Abbe dispersion numbers are respectively designated at $n_D$ and V:

| | | | | |
|---|---|---|---|---|
| $L_1$ | $r_1=+7.031$ | $t_1=5.06$ | $n_D=1.649$ | $V=33.8$ |
| | $r_2=\infty$ | | | |
| $L_2$ | | $t_2=.270$ | $n_D=1.530$ | $V=51.6$ |
| | $r_3=+2.836$ | | | |
| | | $s_1=.338$ | | |
| | $r_4=+7.031$ | | | |
| $L_3$ | | $t_3=.506$ | $n_D=1.649$ | $V=33.8$ |
| | $r_5=\infty$ | | | |
| $L_4$ | | $t_4=.270$ | $n_D=1.530$ | $V=51.6$ |
| | $r_6=+2.836$ | | | |
| | | $s_2=5.086$ (at $\infty$) | | |
| | $r_7=-8.232$ | | | |
| $L_5$ | | $t_5=.203$ | $n_D=1.720$ | $V=29.3$ |
| | $r_8=\infty$ | | | |
| $L_6$ | | $t_6=.438$ | $n_D=1.651$ | $V=55.6$ |
| | $r_9=-3.787$ | | | |

The negative component 1—2 comprising two doublets, the curvatures of the cylindrical surfaces thereof are reduced with resulting reduction of distortion and other aberrations, and the doublets of the system comprising plano-cylindrical elements having their plane surfaces facing each other, the elements are not difficult to manufacture with consequent economy and are conveniently oriented in assembly to bring the generatrices of their cylindrical surfaces into precise parallelism, as distinguished from the difficulty of manufacture of elements both surfaces of which are cylindrical, in which case the generatrices of the two cylindrical surfaces of each element must in manufacture be held in parallelism within close tolerance, say one minute of arc, in order not to degrade the performance of the system.

Notwithstanding the limitations as to correction imposed by the plane interfaces of the doublets of the system, it may be and as described herein is highly corrected for spherical and chromatic aberration, coma, distortion and field curvature particularly in that it provides a relatively flat tangential field in a plane perpendicular to the generatrices of the cylindrical surfaces thereof, and contributing to the correction of the system, in addition to the reduction of the curvatures of the cylindrical surfaces of the negative component by reason of its comprising two doublets, are the following limitations which obtain in the example specificially described herein:

The radius of curvature of the concave surface of each of the negative doublets ($r_3$ and $r_6$) lies between .6 and .9 of the radius $r_9$ of curvature of the convex surface of the positive component, in order to attain a high degree of correction as to spherical aberration, coma, and flat tangential field, but this does not hold if the positive component comprises two doublets.

The dispension of the negative element $L_5$ of the positive doublet is not greater than Abbe number 36 and the refractive index of the positive element $L_6$ of the positive doublet is not less than 1.635 for the D line, in order to attain a high degree of chromatic correction for the positive component together with an overall correction of the system.

The radius of curvature of the concave surface of each of the negative doublets ($r_3$ and $r_6$) lies between .3 and .5 of the radius of curvature of its convex surface ($r_1$ and $r_4$), whether or not these doublets are identical, in order to attain a high degee of chromatic correction of the negative component together with an overall correction of the system.

The axial separation $s_2$ ($r_6$ to $r_7$) of the negative and positive components lies between 1.2 and 1.5 of the radius $r_9$ of curvature of the convex surface of the positive doublet when the system is focused for infinity, in order to attain a high degree of simultaneous satisfaction of the aberrations, but this does not hold if the positive component comprises two doublets.

The axial thickness $t_6$ of the positive element $L_6$ of the positive double is not less than .065 of the radius $r_9$ of curvature of the convex surface of this element, in order to provide adequate edge thickness of this element for relatively large apertures without greatly increasing the overall bulk of the system.

While I have thus described my invention, I do not wish to be limited to the precise details described, as changes may be readily made without departing from the spirit of my invention, but having thus described my invention, I claim as new and desire to secure by Letters Patent the following:

1. An anamorphosing optical system comprising chromatically corrected negative and positive cylindrical components of relatively short and long focal lengths and spaced axially of the system a distance equal to the difference between their focal lengths when the system is focused for infinity and having the generatrices of their cylindrical surfaces disposed in parallelism, said negative component comprising two closely spaced chromatically corrected negative doublets complying substantially with the following table in which dimensions are in terms of inches and beginning with the negative end of the system $L_1$ to $L_4$ designate the elements of said doublets, $r_1$ to $r_6$ the radii of curvature of the surfaces, $t_1$ to $t_4$ the axial thicknesses, $s_1$ the axial separation, $n_D$ the refractive indices for the D line, and V the Abbe dispersion numbers:

| | | | | |
|---|---|---|---|---|
| $L_1$ | $r_1=+7.031$ | $t_1=.506$ | $n_D=1.649$ | $V=33.8$ |
| | $r_2=\infty$ | | | |
| $L_2$ | | $t_2=.270$ | $n_D=1.530$ | $V=51.6$ |
| | $r_3=+2.836$ | | | |
| | | $s_1=.338$ | | |
| | $r_4=+7.031$ | | | |
| $L_3$ | | $t_3=.506$ | $n_D=1.649$ | $V=33.8$ |
| | $r_5=\infty$ | | | |
| $L_4$ | | $t_4=.270$ | $n_D=1.530$ | $V=51.6$ |
| | $r_6=+2.836$ | | | |

2. An anamorphosing optical system comprising negative and positive cylindrical components respectively of relatively short and long focal lengths and spaced axially of the system a distance equal to the difference between their focal lengths when the system is focused for infinity and having the generatrices of their cylindrical surfaces disposed in parallelism, said negative component comprising two closely spaced chromatically corrected negative doublets having relatively weak convex and strong concave exterior surfaces respectively facing away from and toward said positive component, said positive component comprising a chromatically corrected positive doublet having relatively weak concave and strong convex exterior surfaces respectively facing toward and away from said negative component, each of said doublets comprising plano-cylindrical elements having their plane surfaces facing each other, each of said negative doublets having the radius of curvature of its concave surface lying between .6 and .9 of the radius of curvature of the convex surface of said positive doublet, each of said negative doublets having the radius of curvature of its concave surface lying between .3 and .5 of the radius of curvature of its convex surface, and the axial separation of said negative and positive components lying between 1.2 and 1.5 of the radius of curvature of the convex surface of said positive doublet when the system is focused for infinity.

3. An anamorphosing optical system comprising negative and positive cylindrical components respectively of relatively short and long focal lengths and spaced axially of the system a distance equal to the difference between their focal lengths when the system is focused for infinity and having the generatrices of their cylindrical surfaces disposed in parallelism, said negative component comprising two closely spaced chromatically corrected negative doublets having relatively weak convex and strong concave exterior surfaces respectively facing away from and toward said positive component, said positive component comprising a chromatically corrected positive doublet having relatively weak concave and strong convex exterior surfaces respectively facing toward and away from said negative component, each of said doublets comprising plano-cylindrical elements having their plane surfaces facing each other, each of said negative doublets having the radius of curvature of its concave surface lying between .6 and .9 of the radius of curvature of the convex surface of said positive doublet, the dispersion of the negative element of said positive doublet being not greater than Abbe number 36, the refractive index of the positive element of said positive doublet being not less than 1.635 for the D line, each of said negative doublets having the radius of curvature of its concave surface lying between .3 and .5 of the radius of curvature of its convex surface, the axial separation of said negative and positive components lying between 1.2 and 1.5 of the radius of curvature of the convex surface of said positive doublet when the system is focused for infinity, and the axial thickness of the positive element of said positive doublet being not less than .065 of the radius of curvature of the convex surface of this element.

4. An anamorphosing optical system comprising negative and positive cylindrical components respectively of relatively short and long focal lengths and spaced axially of the system a distance equal to the difference between their focal lengths when the system is focused for infinity and having the generatrices of their cylindrical surfaces disposed in parallelism, said negative component comprising two closely spaced chromatically corrected negative doublets, said positive component comprising a chromatically corrected positive doublet, and said system complying substantially with the following table in which the dimensions are in terms of inches and beginning with the negative end of the system $L_1$ to $L_6$ designate the elements of said doublets, $r_1$ to $r_9$ the radii of curvature of the surfaces, $t_1$ to $t_6$ the axial thicknesses, $s_1$ and $s_2$ the axial separations, $n_D$ the refractive indices for the D line, and V the Abbe dispersion numbers:

| | | | | |
|---|---|---|---|---|
| $L_1$ | $r_1=+7.031$ | $t_1=.506$ | $n_D=1.649$ | $V=33.8$ |
| | $r_2=\infty$ | | | |
| $L_2$ | | $t_2=.270$ | $n_D=1.530$ | $V=51.6$ |
| | $r_3=+2.836$ | | | |
| | | $s_1=.338$ | | |
| | $r_4=+7.031$ | | | |
| $L_3$ | | $t_3=.506$ | $n_D=1.649$ | $V=33.8$ |
| | $r_5=\infty$ | | | |
| $L_4$ | | $t_4=.270$ | $n_D=1.530$ | $V=51.6$ |
| | $r_6=+2.836$ | | | |
| | | $s_2=5.086$ (at$\infty$) | | |
| | $r_7=-8.232$ | | | |
| $L_5$ | | $t_5=.203$ | $n_D=1.720$ | $V=29.3$ |
| | $r_8=\infty$ | | | |
| $L_6$ | | $t_6=.438$ | $n_D=1.651$ | $V=55.6$ |
| | $r_9=-3.787$ | | | |

References Cited in the file of this patent

UNITED STATES PATENTS

| | | |
|---|---|---|
| 1,802,099 | Wolfe | Apr. 21, 1931 |
| 1,829,633 | Chretien | Oct. 27, 1931 |
| 1,829,634 | Chretien | Oct. 27, 1931 |
| 1,910,492 | Mellor | May 23, 1933 |
| 1,932,082 | Newcomer | Oct. 24, 1933 |
| 1,934,561 | Rayton | Nov. 7, 1933 |
| 1,943,172 | Ford | Jan. 9, 1934 |
| 1,945,951 | Newcomer | Feb. 6, 1934 |
| 1,962,892 | Chretien | June 12, 1934 |
| 2,006,233 | Chretien | June 25, 1935 |
| 2,019,985 | Lee | Nov. 5, 1935 |

FOREIGN PATENTS

| | | |
|---|---|---|
| 8,512 | Great Britain | of 1898 |